United States Patent
Ono et al.

(10) Patent No.: US 11,966,544 B2
(45) Date of Patent: Apr. 23, 2024

(54) DATA LINE SHIELDING FOR ELECTRONIC DEVICE DISPLAYS WITH TOUCH SENSORS

(71) Applicant: Apple Inc., Cupertino, CA (US)

(72) Inventors: Shinya Ono, Santa Clara, CA (US); Suhwan Moon, Gumi (KR); Dong-Gwang Ha, Santa Clara, CA (US); Jiaxi Hu, San Jose, CA (US); Hao-Lin Chiu, Los Gatos, CA (US); Kwang Soon Park, San Ramon, CA (US); Hassan Edrees, Santa Clara, CA (US); Wen-I Hsieh, Campbell, CA (US); Jiun-Jye Chang, Cupertino, CA (US); Chin-Wei Lin, San Jose, CA (US); Kyung Wook Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/323,659

(22) Filed: May 25, 2023

(65) Prior Publication Data
US 2024/0036680 A1    Feb. 1, 2024

Related U.S. Application Data

(60) Provisional application No. 63/393,694, filed on Jul. 29, 2022.

(51) Int. Cl.
*G06F 3/041* (2006.01)
*G06F 3/044* (2006.01)
*G09G 3/3208* (2016.01)

(52) U.S. Cl.
CPC ........ *G06F 3/04184* (2019.05); *G06F 3/0412* (2013.01); *G06F 3/0444* (2019.05); *G06F 3/0446* (2019.05); *G09G 3/3208* (2013.01); *G06F 2203/04107* (2013.01); *G06F 2203/04112* (2013.01)

(58) Field of Classification Search
CPC ............... G06F 2203/04107; G06F 3/0412
See application file for complete search history.

(56) References Cited

U.S. PATENT DOCUMENTS

| 7,095,550 | B2 | 8/2006 | Kurashina |
| 9,530,801 | B2 | 12/2016 | Nozu et al. |
| 9,704,888 | B2 | 7/2017 | Chen et al. |

(Continued)

*Primary Examiner* — Robin J Mishler
(74) *Attorney, Agent, or Firm* — Treyz Law Group; Jason Tsai (57) ABSTRACT

An electronic device may have a display with touch sensors. One or more shielding layers may be interposed between the display and the touch sensors. The display may include transistors with gate conductors, a first planarization layer formed over the gate conductors, one or more contacts formed in a first source-drain layer within the first planarization layer, a second planarization layer formed on the first planarization layer, one or more data lines formed in a second source-drain layer within the second planarization layer, a third planarization layer formed on the second planarization layer, and a data line shielding structure formed at least partly in a third source-drain layer within the third planarization layer. The data line shielding structure may be a routing line, a blanket layer, a mesh layer formed in one or more metal layers, and/or a data line covering another data line.

20 Claims, 10 Drawing Sheets (56) References Cited

U.S. PATENT DOCUMENTS

| | | | |
|---|---|---|---|
| 9,880,690 | B2 | 1/2018 | Oh |
| 10,658,434 | B2 | 5/2020 | Song et al. |
| 10,908,724 | B2 | 2/2021 | Nakanishi |
| 11,287,709 | B2 | 3/2022 | Fukami et al. |
| 2013/0235020 | A1* | 9/2013 | Kim .................. G02F 1/134363 345/212 |
| 2017/0010740 | A1 | 1/2017 | Chuang et al. |
| 2017/0351149 | A1* | 12/2017 | Chu .................. G02F 1/133514 |
| 2018/0077808 | A1 | 3/2018 | Seo et al. |
| 2018/0166507 | A1 | 6/2018 | Hwang et al. |
| 2020/0142532 | A1 | 5/2020 | Kravets et al. |
| 2020/0401227 | A1 | 12/2020 | Kim et al. |
| 2022/0165217 | A1* | 5/2022 | Lee ...................... G09G 3/3266 |
| 2022/0246767 | A1 | 8/2022 | Murray et al. |
| 2022/0254866 | A1 | 8/2022 | Kim et al. |

* cited by examiner

DATA LINE SHIELDING FOR ELECTRONIC DEVICE DISPLAYS WITH TOUCH SENSORS

This application claims the benefit of U.S. Provisional Patent Application No. 63/393,694, filed Jul. 29, 2022, which is hereby incorporated by reference herein in its entirety.

FIELD

This relates generally to electronic devices, and, more particularly, to electronic devices with displays.

BACKGROUND

Electronic devices often have displays. Touch sensors are sometimes incorporated into the displays. If care is not taken, noise from a display can interfere with the touch sensor functionality.

SUMMARY

An electronic device may include display circuitry and touch sensor circuitry formed over the display circuitry. The display circuitry may include an array of pixels, gate drivers for providing gate line signals to different rows of pixels in the array, and data line drivers for providing data line signals to different columns of pixels in the array. Each column of pixels may be coupled to one or more data lines.

The display circuitry may include data line shielding structures for mitigating signal coupling between the data line signals and the touch sensor circuitry. The display circuitry may include thin-film transistor circuitry formed in one or more thin-film transistor layers, a first planarization layer formed over the thin-film transistor layers, a second planarization layer formed on the first planarization layer, and a third planarization layer formed on the second planarization layer. Light-emitting diode structures such as an anode layer, a cathode layer, and emissive layers between the anode and cathode layers can be formed over the third planarization layer.

Transistor structures such as transistor gate conductors, one or more semiconducting oxide layers forming channels for semiconducting oxide transistors, one or more silicon layers forming channels for silicon transistors, capacitor structures, and other thin-film circuitry can be formed in the thin-film transistor layers. One or more contacts that are coupled to various structures in the thin-film transistor layers can be formed in a first source-drain metal routing layer in the first planarization layer. One or more data lines can be formed in a second source-drain metal routing layer in the second planarization layer. Data line shielding structures can be formed in a third source-drain metal routing layer in the third planarization layer.

The data line shielding structures can be one or more routing lines formed directly over and covering the one or more data lines. The data line shielding structures can be a blanket layer covering data lines for two or more pixel columns in the array. The data line shielding structures can be biased to a positive power supply voltage, a ground power supply voltage, or other voltage levels. The data line shielding structures can be driven using dedicated shielding line bias drivers. The data line shielding structures can be a mesh-like conductive structure formed in one or more metal routing lines.

DETAILED DESCRIPTION

Electronic devices may be provided with displays. Displays may be used for displaying images for users. Displays may be formed from arrays of light-emitting diode pixels or other pixels. For example, a device may have an organic light-emitting diode (OLED) display. The electronic devices may have sensors such touch sensors. This provides the display with touch screen capabilities.

Figure 1:
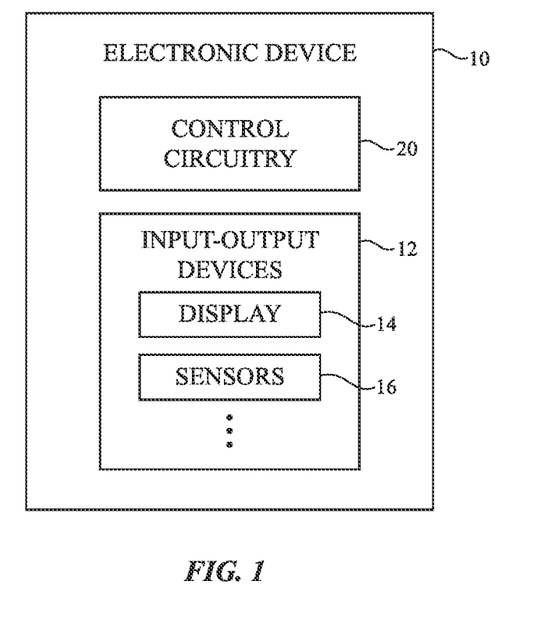
FIG. 1 is a block diagram of an illustrative electronic device in accordance with some embodiments.

A schematic diagram of an illustrative electronic device having a display is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment. Configurations in which device 10 is a wristwatch, cellular telephone, tablet computer, or other portable electronic device may sometimes be described herein as an example. This is illustrative. Device 10 may, in general, be any suitable electronic device with a display.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, application processors, microcontrollers, digital signal processors, baseband processors and other wireless communications circuits, power management units, audio chips, application specific integrated circuits, etc. The processing circuitry of circuitry 20 is sometimes referred to as an application processor or a system processor. During operation, control circuitry 20 may use a display and other output devices in providing a user with visual output and other output.

To support communications between device 10 and external equipment, control circuitry 20 may communicate using communications circuitry 22. Circuitry 22 may include antennas, radio-frequency transceiver circuitry (wireless transceiver circuitry), and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 6 GHz and 300 GHz, a 60 GHz link, or other millimeter wave link, cellular telephone link, wireless local area network link, personal area network communications link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. Display 14 with overlapping touch sensor circuitry that provide touch sensing functionality may sometimes be referred to as a touch screen display. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
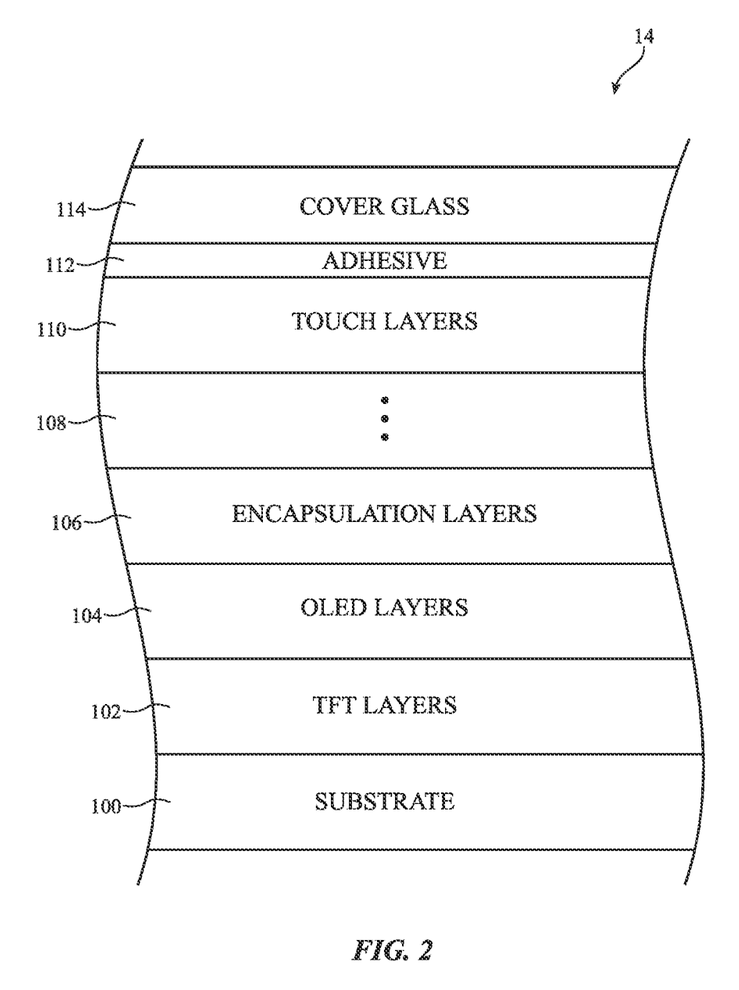
FIG. 2 is a cross-sectional side view of an illustrative touch screen display in accordance with some embodiments.

FIG. 2 is a cross-sectional side view of a touch screen display 14 (i.e., a display with overlapping touch sensor circuitry). As shown in FIG. 2, display 14 may include a substrate such as substrate 100. Substrate 100 may be formed from glass, metal, plastic, ceramic, sapphire, or other suitable substrate materials. As examples, substrate 100 may be an organic substrate formed from polyimide (PI), polyethylene terephthalate (PET), or polyethylene naphthalate (PEN). The surface of substrate 100 may optionally be covered with one or more buffer layers (e.g., inorganic buffer layers such as layers of silicon oxide, silicon nitride, etc.).

Thin-film transistor (TFT) layers 102 may be formed over substrate 100. The TFT layers 102 may include thin-film transistor circuitry such as thin-film transistors (e.g., silicon transistors, semiconducting oxide transistors, etc.), thin-film capacitors, associated routing circuitry, and other thin-film structures formed within multiple metal routing layers and dielectric layers.

Organic light-emitting diode (OLED) layers 104 may be formed over the TFT layers 102. The OLED layers 104 may include a cathode layer, an anode layer, and emissive material interposed between the cathode and anode layers. The cathode layer is typically formed above the anode layer. The cathode layer may be biased to a ground power supply voltage ELVSS (as an example). Ground power supply voltage ELVSS may be 0 V, −2 V, −4, −6V, less than −8 V, −10V, −12V, optionally greater 0 V, or any suitable ground or negative power supply voltage level. If desired, the cathode layer may be formed under the anode layer.

Circuitry formed in the TFT layers 102 and the emissive layers 104 may be protected by encapsulation layers 106. As an example, encapsulation layers 106 may include a first inorganic encapsulation layer, an organic encapsulation layer formed on the first inorganic encapsulation layer, and a second inorganic encapsulation layer formed on the organic encapsulation layer. Encapsulation layers 106 formed in this way can help prevent moisture and other potential contaminants from damaging the conductive circuitry underneath layers 106. This is merely illustrative. Encapsulation layers 106 may include any number of inorganic and/or organic barrier layers formed over the OLED layers 104. If desired, one or more buffer layers such as layer(s) formed using silicon oxide, silicon nitride, or other suitable buffering materials may be formed on encapsulation layers 106. In general, there can be any suitable number or types of protective or buffer layers 108 interposed between encapsulation layers 106 and the touch layers 110. Layers 100, 102, 104 and optionally 106 may collectively be referred to as display layers or a display stackup.

One or more touch layers 110 that implement the touch sensor functions of touch screen display 14 may be formed over the display layers. For example, touch (sensor) layers 110 may include touch sensor circuitry such as horizontal touch sensor electrodes and vertical touch sensor electrodes collectively forming an array of capacitive touch sensor electrodes. A cover glass layer 114 may be formed over the touch sensor layers 110 using adhesive 112 (e.g., optically clear adhesive material). Cover glass 114 may serve as an outer (external) protective layer for touch screen display 14.

Figure 3:
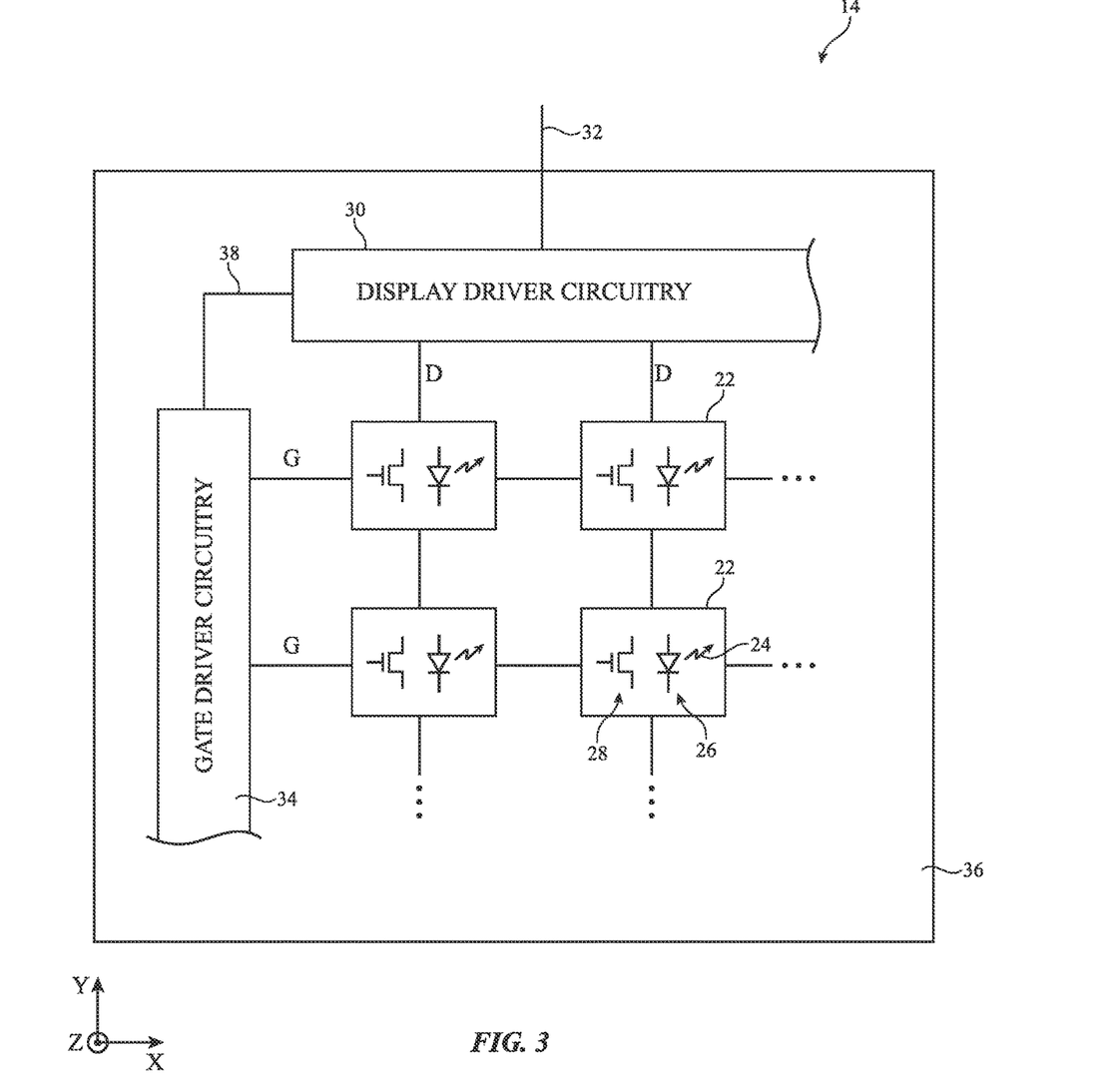
FIG. 3 is a diagram of an illustrative display having an array of pixels in accordance with some embodiments.

A top view of a portion of display 14 is shown in FIG. 3. As shown in FIG. 3, display 14 may have an array of display pixels 22 formed on a substrate 36. Substrate 36 may represent one or more substrates such as substrate 100 of FIG. 2. Pixels 22 may receive data signals over signal paths such as data lines D (sometimes referred to as data signal lines, column lines, etc.) and may receive one or more control signals over control signal paths such as horizontal control lines G (sometimes referred to as gate lines, scan lines, emission lines, row lines, etc.). There may be any suitable number of rows and columns of pixels 22 in display 14 (e.g., tens or more, hundreds or more, or thousands or more).

Each column of pixels 22 can be coupled to one or more data lines. Data lines D in FIG. 3 can represent one or more data lines for each pixel column. In some embodiments, each column of pixels 22 may be coupled to only one data line and is sometimes referred to as a single data line (SDL) display topology. In other embodiments, each column of pixels 22 may be coupled to at least two separate data lines and is sometimes referred to as a double data line (DDL) display topology. As an example, each pixel 22 in a column can be coupled to first and second data lines. As another example, some of pixels 22 in a column are coupled to a first data line while other pixels 22 in that column are coupled to a second data line (e.g., pixels in odd rows may be coupled to the first data line, whereas pixels in even rows may be coupled to the second data line). In yet other embodiments, a column of pixels can be coupled to three or more data lines.

Each pixel 22 may have a light-emitting diode 26 that emits light 24 under the control of a pixel control circuit formed from thin-film transistor circuitry such as thin-film transistors 28 and thin-film capacitors). Thin-film transistors 28 may be polysilicon thin-film transistors, semiconducting oxide thin-film transistors such as indium zinc gallium oxide transistors, or thin-film transistors formed from other semiconductors. Pixels 22 may contain light-emitting diodes of different colors (e.g., red, green, and blue) to provide display 14 with the ability to display color images.

Display driver circuitry 30 may be used to control the operation of pixels 22. The display driver circuitry 30 may be formed from integrated circuits, thin-film transistor circuits, or other suitable electronic circuitry. Display driver circuitry 30 of FIG. 3 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D (e.g., data lines that run down the columns of pixels 22) while issuing clock signals and other control signals to supporting display driver circuitry such as gate driver circuitry 34 over path 38. If desired, display driver circuitry 30 may also supply clock signals and other control signals to gate driver circuitry 34 on an opposing edge of display 14 (e.g., the gate driver circuitry may be formed on more than one side of the display pixel array).

Gate driver circuitry 34 (sometimes referred to as horizontal line control circuitry or row driver circuitry) may be implemented as part of an integrated circuit and/or may be implemented using thin-film transistor circuitry. Horizontal/row control lines G in display 14 may carry gate line signals (scan line control signals), emission enable control signals, and/or other horizontal control signals for controlling the pixels of each row. There may be any suitable number of horizontal control signals per row of pixels 22 (e.g., one or more row control lines, two or more row control lines, three or more row control lines, four or more row control lines, five or more row control lines, etc.).

In certain applications, noise from the display circuitry (e.g., the circuitry in layers 102 and/or 104 in FIG. 2) can leak or be inadvertently coupled to the touch sensor circuitry (e.g., the circuitry in layers 110). For example, power supply noise on the upper cathode layer can sometimes be inadvertently coupled to the touch sensor circuitry. As another example, signals toggling on data lines from the TFT layers 102 can sometimes be inadvertently coupled to the touch sensor circuitry. Such display noise can potentially degrade the accuracy and performance of the touch sensor circuitry.

Figure 4:
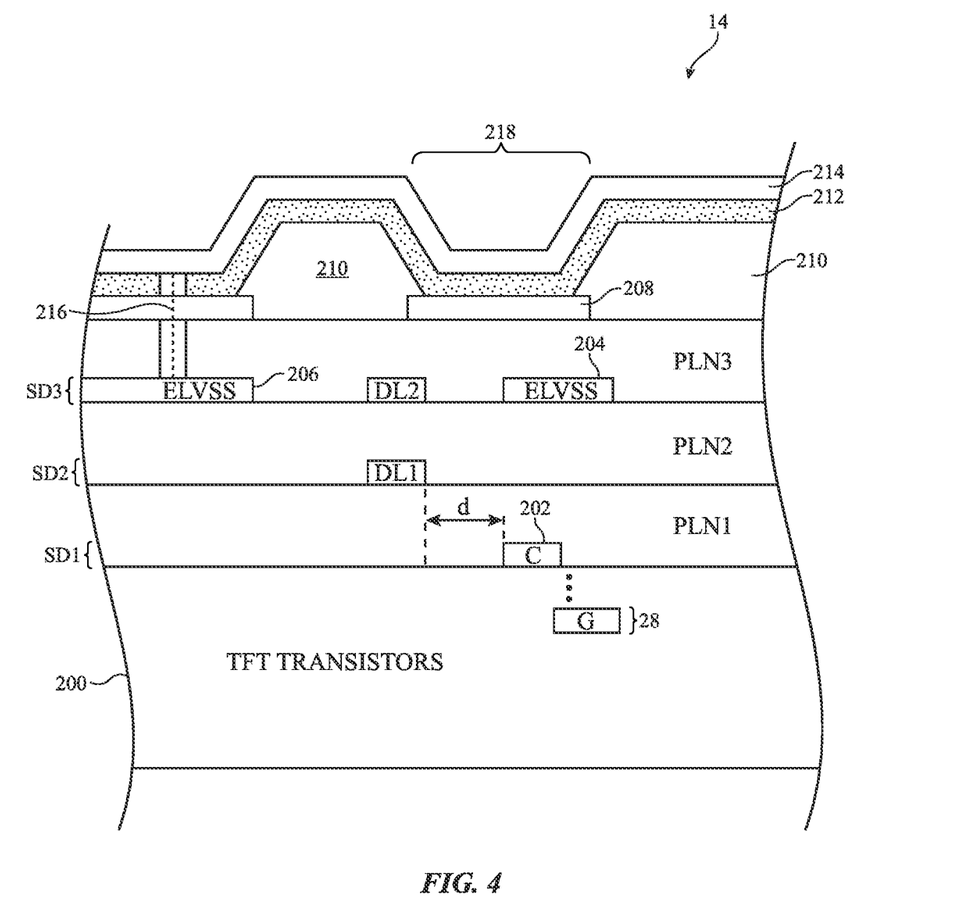
FIG. 4 is a cross-sectional side view of an illustrative display stackup having an upper data line configured to provide shielding for a lower data line in accordance with some embodiments.

In accordance with an embodiment, display 14 can be configured to provide shielding between the data lines and the touch sensor circuitry to minimize the amount of noise that is coupled onto the touch sensor circuitry. FIG. 4 is a cross-sectional side view of an illustrative display stackup implementing a double (dual) data line topology where each column of pixels is coupled to at least two different data lines. Layers 200 may be part of TFT layers 102 and may include thin-film transistor (TFT) structures, capacitors, and other thin-film transistor circuitry. One or more metal gate conductors (G) may be formed as part of layers 200. The gate conductors can be formed as gate terminals for thin-film transistor 28 (e.g., a top gate terminal or a bottom gate terminal), as one or more terminals of a capacitor, as a shielding structure, as a routing line, or other conductive structures within layers 200.

A first planarization layer such as planarization layer PLN1 may be formed over layers 200. Planarization layer PLN1 may be formed from organic dielectric materials such as a polymer. One or more contact structures such as contact(s) 202 can be formed in a first source-drain layer SD1 within first planarization layer PLN1. Contact(s) 202 may be coupled to source or drain terminals of the thin-film transistors within layers 200. Contact(s) 202 may also be coupled to gate terminals of the thin-film transistors within layers 200. Contact(s) 202 may also be coupled to capacitor terminals or other circuitry within layers 200. First planarization layer PLN1 can also be said to be formed over or on the first source-drain layer SD1.

A second planarization layer such as planarization layer PLN2 may be formed over the first planarization layer PLN1. Similar to PLN1, second planarization layer PLN2 may be formed from organic dielectric materials such as a polymer. A first data line such as data line DL1 can be formed in a second source-drain layer SD2 within second planarization layer PLN2. Second planarization layer PLN2 can also be said to be formed over or on the second source-drain layer SD2. To accommodate routing of additional data lines or to accommodate a shielding layer for the data lines, a third planarization layer can be used.

A third planarization layer such as planarization layer PLN3 may be formed over the third planarization layer PLN3. Similar to PLN2, third planarization layer PLN3 may be formed from organic dielectric materials such as a polymer. In contrast, the layers below the organic planarization layers such as layers 200 are typically formed from inorganic dielectric material such as silicon nitride, silicon oxide, etc. A second data line such as data line DL2 can be formed in a third source-drain layer SD3 within third planarization layer PLN3. Data lines DL1 and DL2 may be coupled to a column of pixels in the array of pixels within display 14. Additional power line conductors such as conductors 204 and 206 that are driven to a display ground voltage ELVSS can also be formed in the third source-drain layer SD3. Cathode layer 214 may also be coupled to at least one of the power line conductors such as conductor 206 through one or more via structures in conductive path 216. Connected in this way, cathode layer 214 can be bias to display ground voltage ELVSS. If desired, additional planarization layers can be formed to accommodate additional shielding structures. Third planarization layer PLN3 can also be said to be formed over or on the third source-drain layer SD3.

An anode conductor such as anode conductor 208 can be formed on planarization layer PLN3. Anode conductor 208 is sometimes referred to as a pixel electrode. A cathode layer such as cathode layer 214 can be formed over anode conductor 208 to form the two terminals on a light-emitting diode. An emissive layer such as organic light-emissive layer 212 can be interposed between anode conductor 208 and cathode layer 214. Emissive layer 212 is an electroluminescent organic layer that emits light in response to applied current through the light-emitting diode. In a color display, emissive layer 212 in the array of pixels in the display can include red emissive layers for emitting red light in red pixels, green emissive layers for emitting green light in green pixels, and blue emissive layers for emitting blue light in blue pixels. In addition to the emissive organic layer in each diode, each diode may include additional layers for enhancing diode performance such as an electron injection layer, an electron transport layer, a hole transport layer, and a hole injection layer. Layers such as these may be formed from organic materials (e.g., materials on the upper and lower surfaces of electroluminescent material in layer 212).

Structure 210 (sometimes referred to as a pixel definition layer or a pixel definition structure) has an array of openings such as opening 218 aligned to the anode terminals of each pixel. The shape of the opening in pixel definition layer 210 therefore defines the shape of the light-emitting area for each diode. Opening 218 also defines the emission area for each light-emitting diode. Pixel definition layer 210 may be formed from a photoimageable material that is photolithographically patterned (e.g., dielectric material that can be processed to form photolithographically defined openings such as photoimageable polyimide, photoimageable polyacrylate, etc.), may be formed from material that is deposited through a shadow mask, or may be formed from material that is otherwise patterned. The walls of the diode openings in pixel definition layer may, if desired, be sloped, as shown by sloped sidewalls in FIG. 4. Layers 208, 212, and 214 may sometimes be referred to collectively as the OLED layers (see, e.g., layers 104 in FIG. 2). Additional layers such as encapsulation layers 106 and touch layers 110 may be formed over cathode layer 214.

In the example of FIG. 4, second data line DL2 in the SD3 metal routing layer is formed directly over data line DL1 in the SD2 metal routing layer. Second data line DL2 may at least partly cover or fully cover first data line DL1 (e.g., second data line DL2 may at least partially overlap or completely overlap with first data line DL1). By forming second data line DL2 directly over first data line DL1 in this way, data line DL2 can be used as a shielding layer for data line DL1 to help decouple data line DL1 from the anode layer 208 and from the cathode layer 214. Using one of the dual data lines as a shielding layer can help reduce crosstalk between the data lines and the overlying touch sensor layers. Moreover, forming data lines in two different layers can allow data line DL1 to be positioned further away from conductive structures in planarization layer PLN1 and conductive structures in layers 200 (e.g., stacking data lines DL1 and DL2 in this way can maximize the horizontal distance d between the data lines and other conductive pixel structures below), which can reduce the amount of coupling between the pixel structures and the data lines. Reducing coupling in this way can improve display performance while minimize undesired display artifacts.

Figure 5:
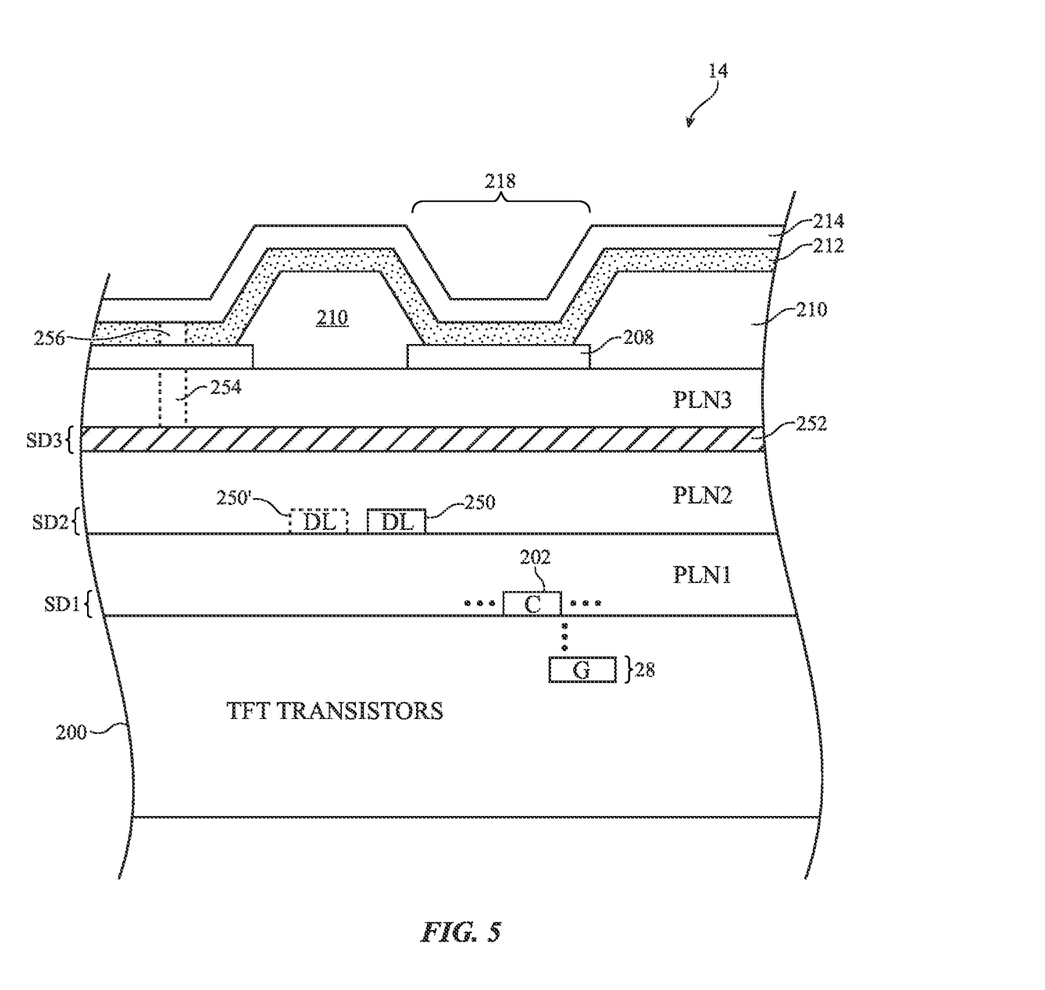
FIG. 5 is a cross-sectional side view of an illustrative display stackup having a shielding layer disposed over one or more data lines in accordance with some embodiments.

The example of FIG. 4 in which one data line is used a shielding structure for another data line is illustrative and is not intended to limit the scope of the present embodiments. FIG. 5 shows another display stackup having a dedicated shielding layer such as shielding layer 252 formed over one or more data lines. As shown in FIG. 5, one or more contacts 202 such as source-drain contacts for coupling to underlying transistor source-drain terminals, gate contacts for coupling to underlying transistor gate terminals G, capacitor contacts for coupling to underlying capacitive terminals, or contacts for coupling to other thin-film circuitry in layers 200 may be formed in the first source-drain metal routing layer SD1 within first planarization layer PLN1. One or more data lines can be formed in the second source-drain metal routing layer SD2 within second planarization layer PLN2. In a single data line display topology/architecture, each column of pixels may be coupled to only one data line such as data line 250 that is formed in the SD2 routing layer. In a dual data line display topology/architecture, each column of pixels may be coupled to two different data lines such as data lines 250 and 250' both formed in the same SD2 routing layer. Data lines 250 and 250' can both be formed on one side of a pixel column or on opposing sides of the pixel column.

Shielding layer 252 may be formed in the third source-drain metal routing layer SD3. Shielding layer 252 may be implemented as a conductive mesh structure, a transparent conductive film, a conductive mesh structure overlapped by a transparent conductive film, or other suitable electrical shielding configurations. Shielding layer 252 may be a blanket layer that extends from one side of the pixel array to another side of the pixel array. Shielding layer 252 may have an overall width that is substantially greater than the width of individual data lines. As an example, shielding layer 252 may be coupled to cathode layer 214 through optional via structures 254 and 256. Coupled in this way, shielding layer 252 may be driven to display ground voltage ELVSS. This is merely illustrative. As another example, shielding layer 252 need not be shorted to cathode layer 214 (e.g., via structures 254 and 256 can be omitted so that shielding layer 252 is decoupled from cathode layer 214) and can be biased to other voltage levels (e.g., using one or more peripheral drivers of FIG. 8). Shielding layer 252 can be biased to a positive display power supply voltage ELVDD (e.g., using driver 310 of FIG. 8). Shielding layer 252 can be biased to a voltage level that is greater ELVDD. Shielding layer 252 can be biased to a voltage level that is less than ELVSS. Shielding layer 252 can be biased to an intermediate voltage level that is greater than ELVSS and less than ELVDD. Using shielding layer 252 to provide shielding for the one or more underlying data lines can help reduce crosstalk between the data lines and the overlying touch sensor layers, which can improve display performance while minimize undesired display artifacts.

Figure 6:
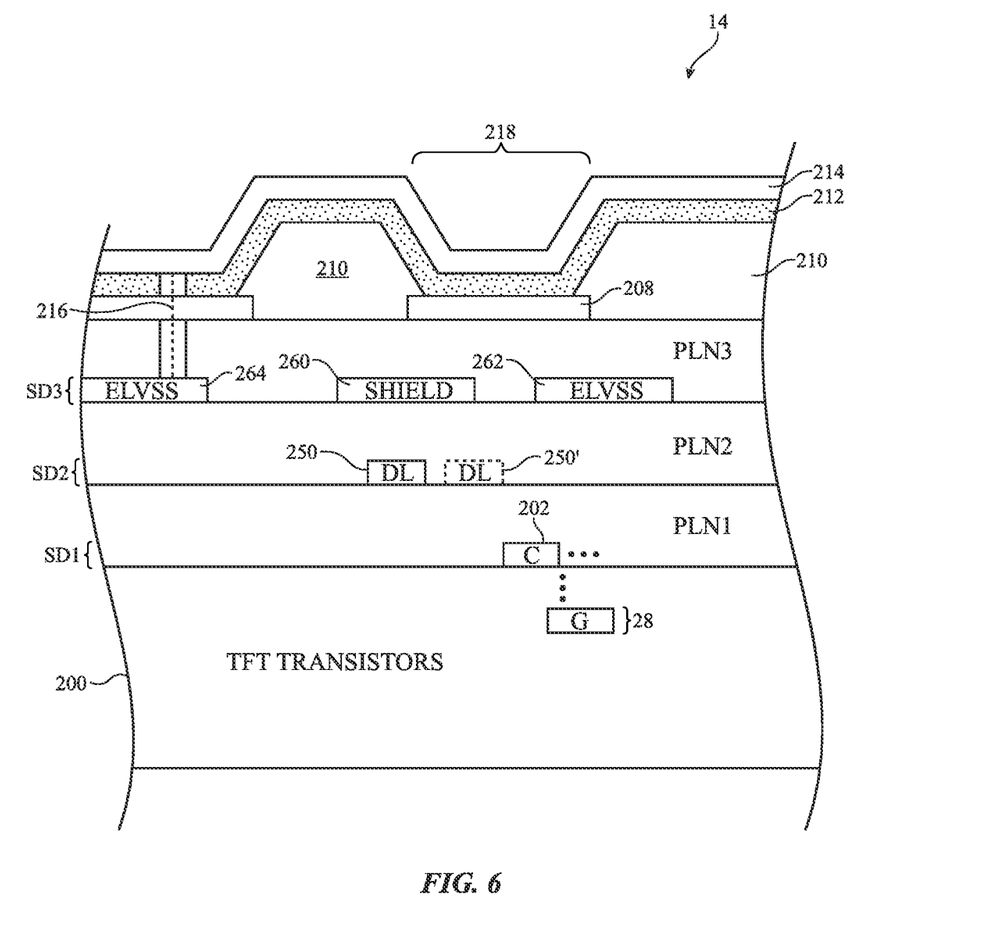
FIG. 6 is a cross-sectional side view of an illustrative display stackup having a shielding conductor and a separate power conductor formed in the same layer over one or more data lines in accordance with some embodiments.

The example of FIG. 5 in which a blanket shielding layer 252 is used to provide shielding for the data lines is illustrative and is not intended to limit the scope of the present embodiments. FIG. 6 shows another display stackup having a shielding conductor 260 that is separate from the power supply voltage conductors in the same layer. As shown in FIG. 6, one or more contacts 202 such as source-drain contacts for coupling to underlying transistor source-drain terminals, gate contacts for coupling to underlying transistor gate terminals G, capacitor contacts for coupling to underlying capacitive terminals, or contacts for coupling to other thin-film circuitry in layers 200 may be formed in the first source-drain metal routing layer SD1 within first planarization layer PLN1. One or more data lines can be formed in the second source-drain metal routing layer SD2 within second planarization layer PLN2. In a single data line display architecture, each column of pixels may be coupled to only one data line such as data line 250 that is formed in the SD2 routing layer. In a double data line display architecture, each column of pixels may be coupled to two different data lines such as data lines 250 and 250' both formed in the same SD2 routing layer. Data lines 250 and 250' can both be formed on one side of a pixel column or on opposing sides of the pixel column.

Figure 7A:
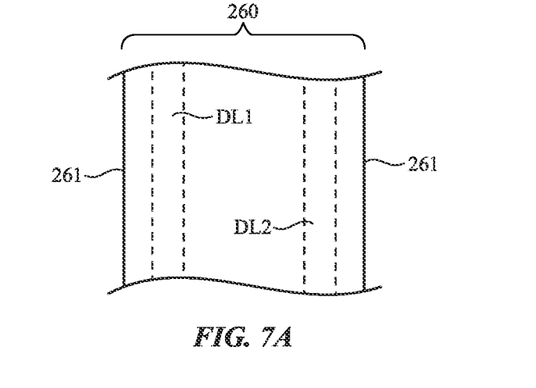
FIGS. 7A and 7B are top views showing a shielding conductor that completely covers and overlaps with one or more data lines in accordance with some embodiments.

Shielding conductor (structure) 260 may be formed in the third source-drain metal routing layer SD3. Shielding conductor 260 may be implemented as a conductive routing line, a transparent conductive film, a conductive routing line overlapped by a transparent conductive film, or other suitable electrical shielding configurations. Shielding conductor 260 may cover the one or more underlying data lines (see, e.g., the top plan view of FIG. 7A). The dotted lines in FIG. 7A delineate the peripheral edges of each data line. As shown in FIG. 7A, shielding conductor 260 may be a routing line having peripheral edges 261 that extend past the edges of the one or more data lines DL1 and DL2. Arranged in this way, shield 260 can be said to fully cover the one or more data lines DL1 and DL2. The data lines DL1 and DL2 can also be said to be overlapped by shielding conductor 260.

Figure 7B:
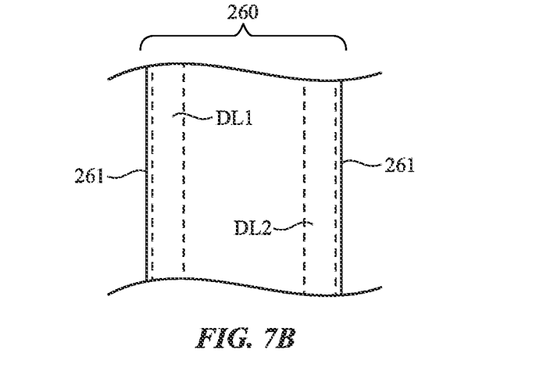

FIG. 7B illustrates another arrangement in which shielding conductor 260 is a routing line having peripheral edges 261 that are aligned with the edges of the one or more underlying data lines DL1 and DL2 (e.g., peripheral edge 261 is flush with one of the peripheral edges of an underlying data line). Arranged in this way, shield 260 can be said to fully cover the one or more data lines DL1 and DL2. The data lines DL1 and DL2 can also be said to be overlapped by shielding conductor 260.

Figure 7C:
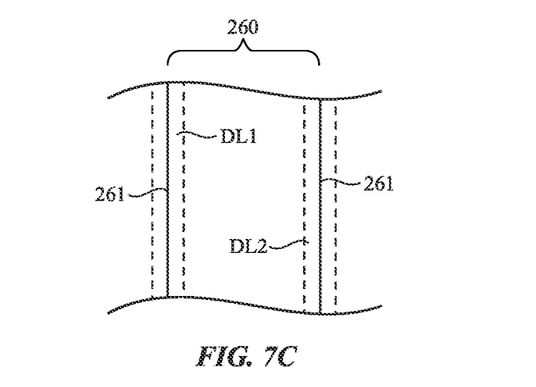
FIG. 7C is a top view showing a shielding conductor that partially covers and partially overlaps with one or more data lines in accordance with some embodiments.

FIG. 7C illustrates another arrangement in which shielding conductor 260 is a routing line having peripheral edges 261 that do not extend past the peripheral edge(s) of the one or more underlying data lines DL1 and DL2. As shown in FIG. 7C, data line DL1 may have a left peripheral edge that extends past the left peripheral edge 261 of shielding line 260. Similarly, data line DL2 may have a right peripheral edge that extends past the right peripheral edge 261 of shielding line 260. Arranged in this way, shield 260 can be said to only partially cover the one or more data lines DL1 and DL2. The data lines DL1 and DL2 can also be said to be partially overlapped by shielding conductor 260. If desired, shielding line 260 might partly cover data line DL1 while fully covering data line DL2, or vice versa.

Referring back to FIG. 6, the power conductors such as power conductors 262 and 264 (sometimes referred to as power supply voltage conductors) surrounding shielding conductor 260 may be biased to power supply voltages such as ground power supply voltage ELVSS. Power conductors 262 and 264 are also formed in the SD3 metal routing layer. If desired, at least one of the power conductors in SD3 such as power conductor 262 may be coupled to cathode layer 214 through via path 216.

Shielding conductor 260 may be biased to a different voltage than the power supply voltage associated with the surrounding power conductors. Shielding conductor 260 can be biased to positive display power supply voltage ELVDD. Shielding conductor 260 can be biased to a voltage level that is greater ELVDD. Shielding conductor 260 can be biased to a voltage level that is less than ELVSS. Shielding conductor 260 can be biased to an intermediate voltage level that is greater than ELVSS and less than ELVDD. As another example, shielding conductor 260 can be driven to another ground voltage ELVSS' that is different than the ELVSS provided as a common ground for the light-emitting diode. If desired, ELVSS' can be separately driven by another peripheral driver (e.g., ELVSS may be driven by a first set of ground power supply drivers, whereas ELVSS' may be driven by a second set of ground power supply drivers separate from the first set of ground power supply drivers). Using shielding conductor 260 to provide shielding for the one or more underlying data lines can help reduce crosstalk between the data lines and the overlying touch sensor layers, which can improve display performance while minimize undesired display artifacts.

Figure 8:
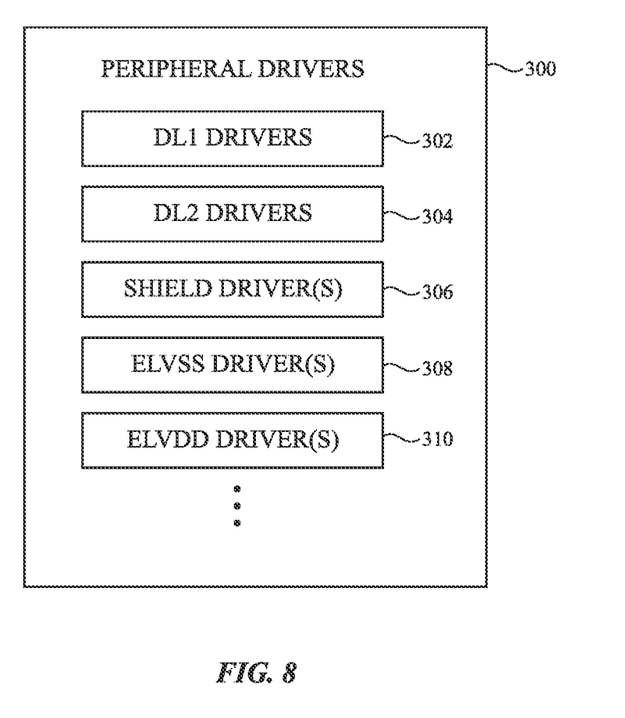
FIG. 8 is a block diagram of illustrative peripheral driver circuits that can be included in an electronic device display in accordance with some embodiments.

FIG. 8 is a block diagram of illustrative peripheral driver circuits that can be included in display 14. Display 14 can include peripheral drivers 300 that are formed at various locations along the peripheral edges of a pixel array. As shown in FIG. 8, peripheral drivers 300 may include data line driving circuits such as data line drivers 302 configured to drive data lines DL1 and data line drivers 304 configured to drive data lines DL2, shield driving circuits such as shield conductor drivers 306 configured to drive one or more shielding conductors or layers of the type described in connection with FIGS. 2-7, and power supply drivers such as driver(s) 308 configured to drive one or more power supply lines (terminals) to ground power supply voltage ELVSS and driver(s) 310 configured to drive one or more power supply lines (terminals) to positive power supply voltage ELVDD. The DL2 drivers 304 can be omitted for single data line display architectures. Shield conductor driver 306 can be used to drive the data line shielding layer or the data line shielding conductor to ELVSS, to ELVDD, to a voltage that is less than ELVSS, to a voltage that is greater than ELVDD, to a voltage that is between ELVSS and ELVDD, etc. Other types of peripheral driver circuits can also be included within block 300. Using a separate driving circuit 306 to drive or bias the data line shielding conductor(s) can help further isolate the coupling from the data lines to the touch sensor layers.

Figure 9:
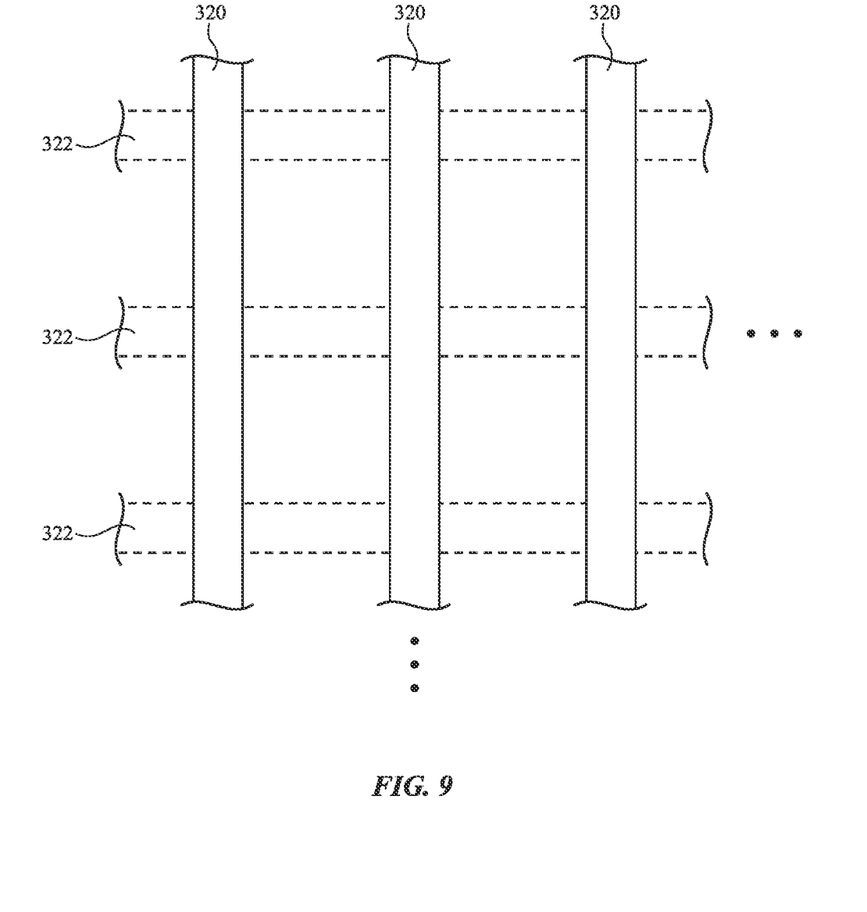
FIG. 9 is a top view of an illustrative shielding structure formed using conductive lines from at least two different metal routing layers in accordance with some embodiments.

The shielding conductor (layer) and/or the power supply conductors of FIGS. 4-7 can be formed as a 2-dimensional (2D) mesh structure in one or more metal routing layers. FIG. 9 is a top (plan) view of an illustrative shielding structure formed using conductive lines from at least two different metal routing layers. As shown in FIG. 9, a first set of vertical routing lines 320 might be formed in the SD3 metal routing layer, whereas a second set of horizontal routing lines 322 might be formed in the SD1 metal routing layer, in one or more gate layers (e.g., a metal layer in which a transistor gate conductor can be formed), in the anode layer, or other conductive layers within layers 200. Vertical routing lines 320 and horizontal routing lines 322 may be shorted together using one or more vias optionally located at one or more intersections between lines 320 and 322. If desired, a power supply mesh such as a positive power supply mesh biased to ELVDD or a ground mesh biased to ELVSS can also be formed in this way.

Figure 10:
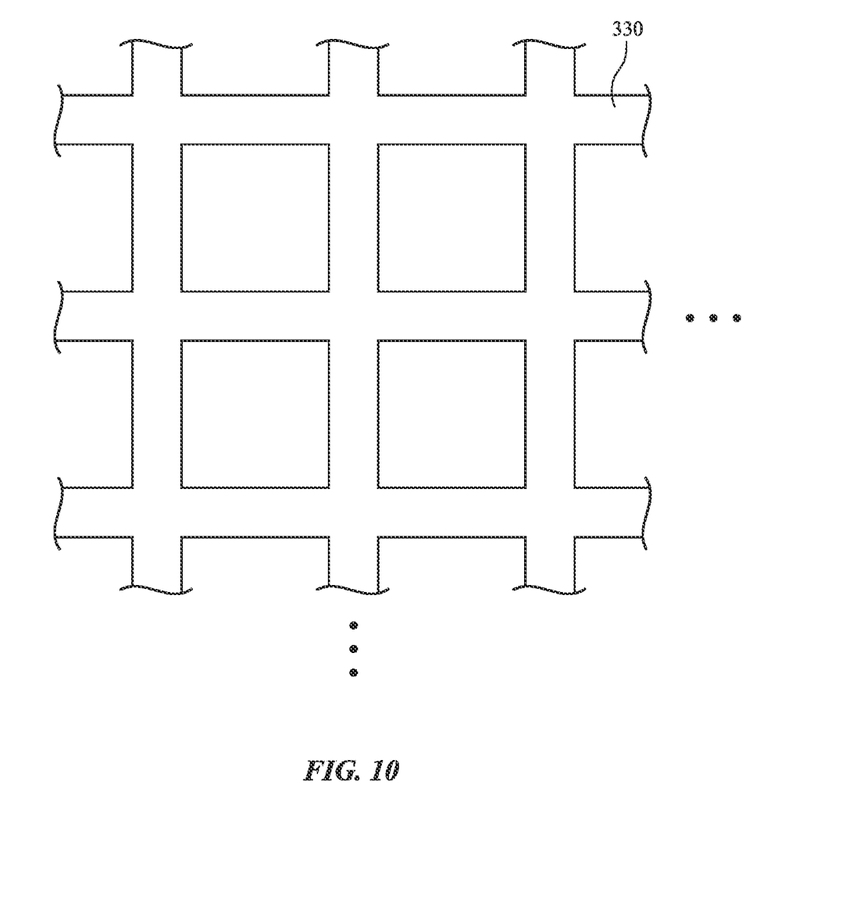
FIG. 10 is a top view of an illustrative shielding structure formed from a conductive mesh in a single metal routing layer in accordance with some embodiments.

FIG. 10 is a top (plan) view of an illustrative shielding structure formed using conductive lines from a single metal routing layer. As shown in FIG. 10, routing lines 330 may form a mesh structure having an array of openings each of which is aligned to a respective emission area of a display pixel (see, emission region 210 in FIGS. 4-7). Conductive mesh 330 may be formed using transparent conductive material or using opaque conductive material in the SD3 metal routing layer, in the SD1 metal routing layer, in one or more gate layers (e.g., a metal layer in which a transistor gate conductor can be formed), in the anode layer, or other conductive layers within layers 200. If desired, a power supply mesh such as a positive power supply mesh biased to ELVDD or a ground mesh biased to ELVSS can also be formed in this way.

The foregoing is merely illustrative and various modifications can be made to the described embodiments. The foregoing embodiments may be implemented individually or in any combination.

What is claimed is:

1. Display circuitry comprising:
    a transistor having a gate conductor;
    a first planarization layer formed over the gate conductor;
    one or more contacts formed in a first source-drain routing layer within the first planarization layer;
    a second planarization layer formed on the first planarization layer;
    one or more data lines formed in a second source-drain routing layer within the second planarization layer;
    a third planarization layer formed on the second planarization layer; and
    a data line shielding conductor formed in a third source-drain routing layer within the third planarization layer, the data line shielding conductor disposed directly over the one or more data lines.

2. The display circuitry of claim 1, further comprising:
    a power supply voltage conductor formed in the third source-drain routing layer;
    a first driver circuit for driving the power supply voltage conductor; and
    a second driver circuit for driving the data line shielding conductor.

3. The display circuitry of claim 2, wherein the first driver circuit is configured to drive the power supply voltage conductor to a first ground voltage and wherein the second driver circuit is configured to drive the data line shielding conductor to a second ground voltage.

4. The display circuitry of claim 2, wherein the first driver circuit is configured to drive the power supply voltage conductor to a first voltage and wherein the second driver circuit is configured to drive the data line shielding conductor to a second voltage different than the first voltage.

5. The display circuitry of claim 2, further comprising:
    an anode conductor formed on the third planarization layer;
    a cathode layer formed over the anode conductor; and
    emissive layers disposed between the anode conductor and the cathode layer, wherein the cathode layer is coupled to the power supply voltage conductor through one or more vias.

6. The display circuitry of claim 1, wherein the data line shielding conductor comprises a conductive mesh structure formed entirely in the third source-drain routing layer.

7. The display circuitry of claim 1, wherein the data line shielding conductor comprises a conductive mesh structure formed in the third source-drain routing layer and another metal routing layer above or below the second source-drain routing layer.

8. The display circuitry of claim 1, wherein the data line shielding conductor fully covers the one or more data lines.

9. The display circuitry of claim 1, wherein the data line shielding conductor partially covers the one or more data lines.

10. Display circuitry comprising:
    a transistor having a gate conductor;
    a first planarization layer formed over the gate conductor;
    one or more contacts formed in a first source-drain routing layer within the first planarization layer;
    a second planarization layer formed on the first planarization layer;
    one or more data lines formed in a second source-drain routing layer within the second planarization layer;
    a third planarization layer formed on the second planarization layer; and
    a data line shielding layer formed in a third source-drain routing layer within the third planarization layer.

11. The display circuitry of claim 10, further comprising:
    an anode conductor formed on the third planarization layer;
    a cathode layer formed over the anode conductor; and
    emissive layers disposed between the anode conductor and the cathode layer, wherein the cathode layer is coupled to the data line shielding layer through one or more vias.

12. The display circuitry of claim 10, further comprising:
    an anode conductor formed on the third planarization layer;
    a cathode layer formed over the anode conductor; and
    emissive layers disposed between the anode conductor and the cathode layer, wherein the cathode layer is decoupled from the data line shielding layer.

13. The display circuitry of claim 12, further comprising:
    a first driver circuit for driving the cathode layer to a first voltage; and
    a second driver circuit for driving the data line shielding layer to a second voltage different than the first voltage.

14. The display circuitry of claim 10, wherein the data line shielding layer comprises a conductive mesh structure formed entirely in the third source-drain routing layer.

15. The display circuitry of claim 10, wherein the data line shielding layer comprises a conductive mesh structure formed in the third source-drain routing layer and another metal routing layer above or below the second source-drain routing layer.

16. Display circuitry comprising:
- a transistor having a gate conductor;
- a first planarization layer formed over the gate conductor;
- one or more contacts formed in a first source-drain routing layer within the first planarization layer;
- a second planarization layer formed on the first planarization layer;
- a first data line formed in a second source-drain routing layer within the second planarization layer;
- a third planarization layer formed on the second planarization layer; and
- a second data line formed in a third source-drain routing layer within the third planarization layer, wherein the second data line is formed directly over the first data line.

17. The display circuitry of claim 16, wherein the first data line is coupled to a first group of pixels in a column of pixels and wherein the second data line is coupled to a second group of pixels in the column of pixels.

18. The display circuitry of claim 16, further comprising:
- an anode conductor formed on the third planarization layer;
- a cathode layer formed over the anode conductor;
- emissive layers disposed between the anode conductor and the cathode layer; and
- a power supply voltage conductor formed in the third source-drain routing layer and coupled to the cathode layer through one or more vias.

19. The display circuitry of claim 16, further comprising:
- a power supply voltage conductor formed in the third source-drain routing layer, the power supply voltage conductor being biased to a ground voltage.

20. The display circuitry of claim 16, wherein the second data line covers the first data line.

* * * * *